(No Model.) 2 Sheets—Sheet 1.
W. H. BYRAM.
BOILER FOR HEATING BUILDINGS.
No. 304,609. Patented Sept. 2, 1884.
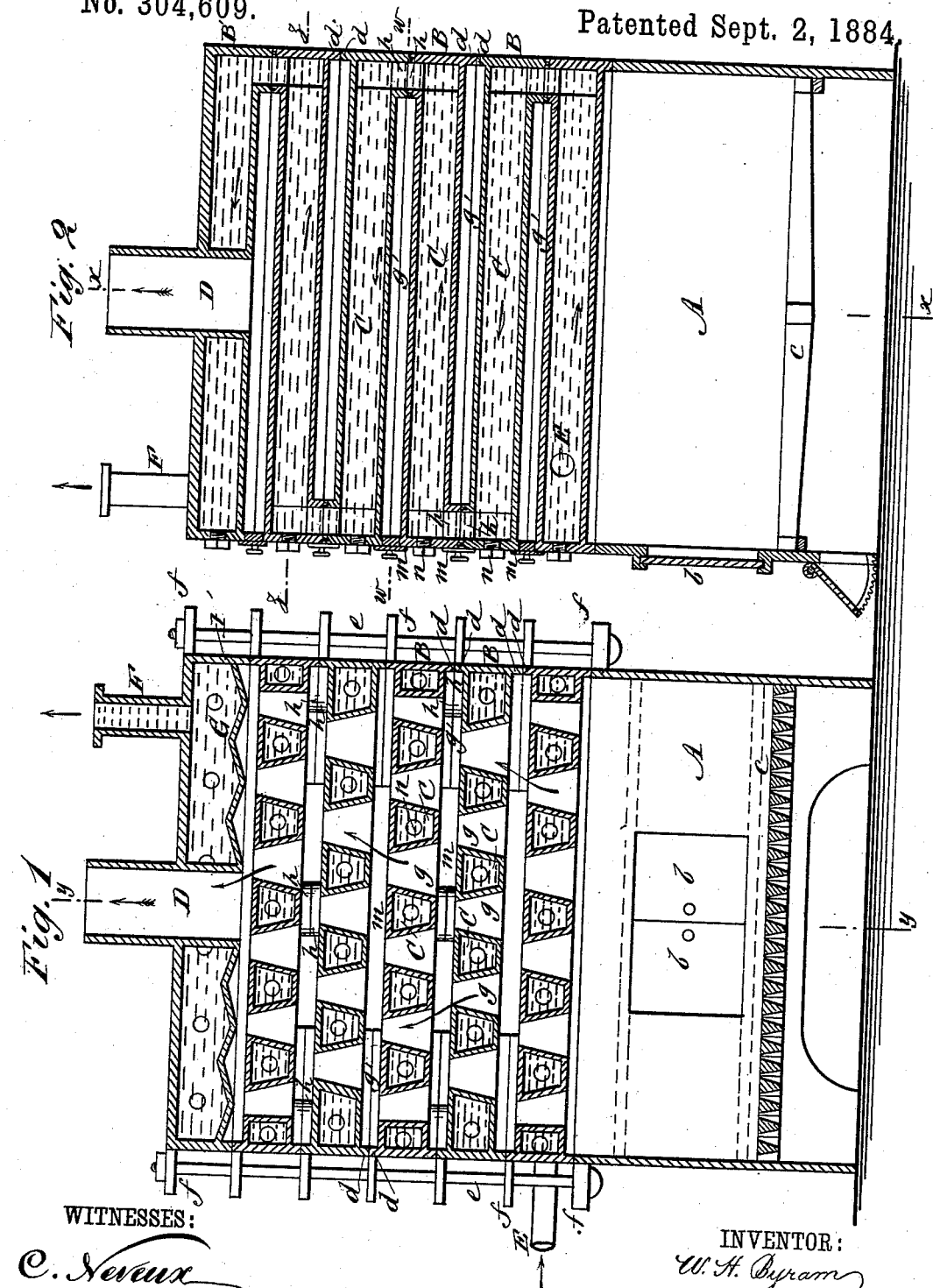
WITNESSES:
C. Neveux
C. Sedgwick
INVENTOR:
W. H. Byram
BY Munn & Co
ATTORNEYS.

(No Model.) 2 Sheets—Sheet 2.
W. H. BYRAM.
BOILER FOR HEATING BUILDINGS.
No. 304,609. Patented Sept. 2, 1884.
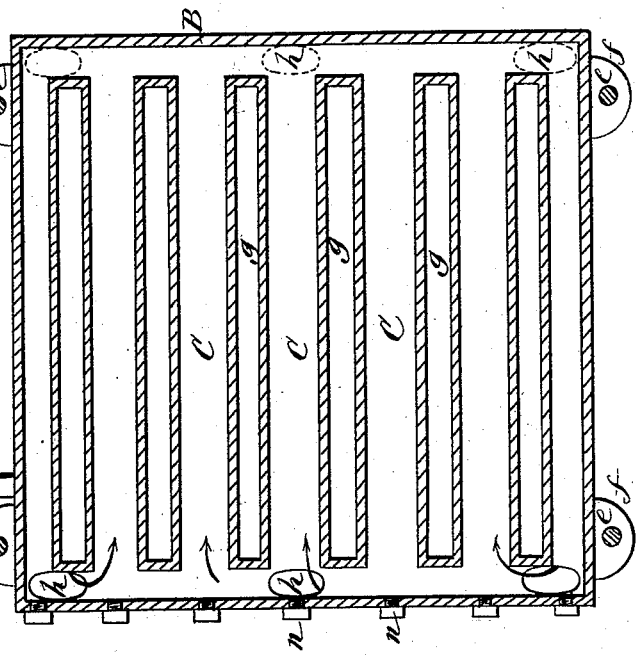
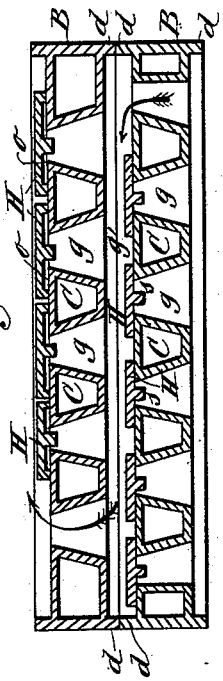
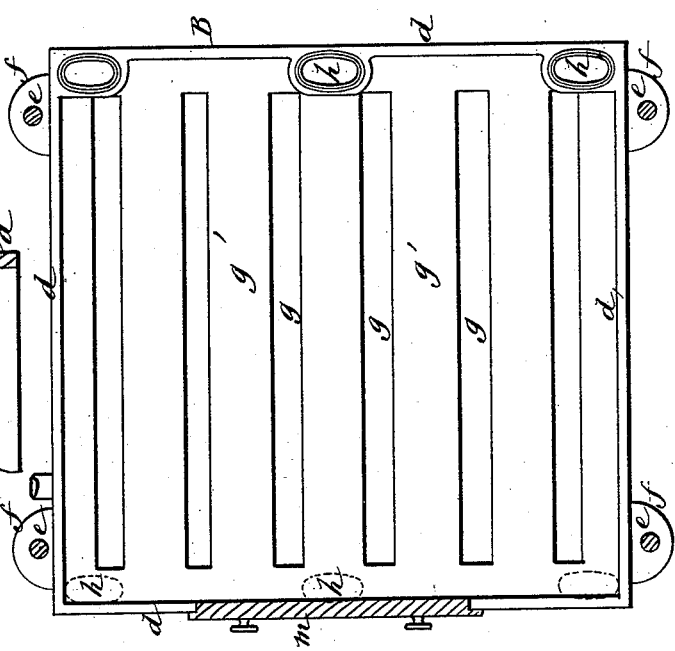
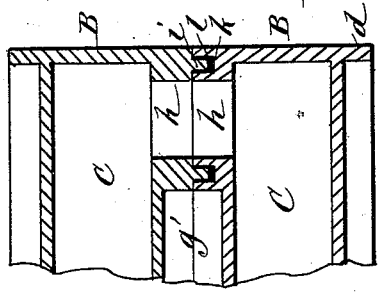
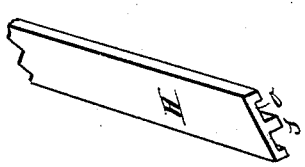
WITNESSES:
C. Neveux
C. Sedgwick
INVENTOR:
W. H. Byram
BY Munn & Co
ATTORNEYS.
N. PETERS, Photo-Lithographer, Washington, D. C.

UNITED STATES PATENT OFFICE.

WILLIAM H. BYRAM, OF NEW YORK, ASSIGNOR OF ONE-HALF TO JOHN REDMAN, OF FISHKILL LANDING, N. Y.

BOILER FOR HEATING BUILDINGS.

SPECIFICATION forming part of Letters Patent No. 304,609, dated September 2, 1884.

Application filed December 6, 1883. (No model.)

*To all whom it may concern:*

Be it known that I, WILLIAM H. BYRAM, of the city, county, and State of New York, have invented certain new and useful Improvements in Boilers for Heating Buildings and other Purposes, of which the following is a full, clear, and exact description.

This invention relates to boilers composed of a series of sections mounted one upon the other for use either in heating and circulating water or for generating and circulating steam, to be used in heating buildings and for other purposes. It has more particularly for its object the production of an efficient and economical sectional boiler, which shall maintain a positive circulation and be comparatively or wholly free from leakage, separate and detachable tubes, liable to produce leakage, being avoided in its construction.

The invention consists in the peculiar construction and arrangement of parts, as hereinafter fully described, and pointed out in the claim.

Reference is to be had to the accompanying drawings, forming part of this specification, in which similar letters of reference indicate corresponding parts in all the figures.

Figure 1 represents a vertical section upon the line $x\ x$ in Fig. 2 of a boiler embodying my invention; Fig. 2, a further vertical section upon the line $y\ y$ in Fig. 1 of the same; Fig. 3, a horizontal section upon the line $w\ w$ in Fig. 2, and Fig. 4 a further horizontal section upon the line $z\ z$ in Fig. 2. Fig. 5 is a vertical section, upon a larger scale, of two of the boiler-sections in part in illustration of the mode of connecting the water-ducts of said sections. Fig. 6 is a further vertical section in a plane at right angles to Fig. 5, upon the same reduced scale as Figs. 1, 2, 3, and 4, of two of the boiler-sections, showing the application to or on the water-ducts of certain draft-diverting plates; and Fig. 7, a view in perspective of one of said plates detached.

Referring in the first instance to the first five figures of the drawings, A indicates the lower or fire-box section of the boiler; $b\ b$, its fire-doors, and $c$ the grate. This section, as also the several horizontal sections B B B', mounted upon it, are all cast or made of metal, and preferably of square or parallelogrammic form. The sections B B are each constructed with upper and lower marginal portions or ledges, $d\ d$, to provide for the support of the several sections of the boiler, one upon the other, and to give a flush finish to the sides of the boiler. The joints thus formed may, if necessary, have putty or cement applied to them to prevent leakage, or they may be made close-fitting without any such filling, and the several sections are firmly held or bound together by bolts $e\ e$, arranged to pass through lugs $f\ f$ on opposite sides of the boiler. The sections B B have each cast on or with them a series of parallel horizontal water-ducts, C C, of a hollow bar-like construction in their transverse section, tapering or diminishing downward. These hollow tapering bar-like water-ducts C C, which are formed in part of upper and lower diaphragms cast on or with the sides of the section, are arranged staggering in vertical relation with each other—that is, the several intermediate ducts—whereby the ducts of either one section will be over the flue or fire spaces $g$ between the ducts of the section immediately above or below it, thus establishing a series of tortuous vertical courses between and under and over the ducts for heating gaseous products of combustion from the fire-box A to the smoke-outlet D, said water-ducts only being of such depth as to provide for a free passage of the heated gases over and under as well as between them. The tapering configuration of the flue-spaces $g$ as formed by the transverse shape of the ducts C C eases the passage of the heated gases from the one boiler-section to the next one above it. Furthermore, the series of water-ducts C C in each section are in free communication with each other at their opposite ends all around the sides of the boiler within the sections to which they belong, as clearly shown in Fig. 4, and such water-spaces of the different sections are alternately connected above and below, on opposite sides of the boiler, by the tubular projections or nozzles $h\ h$, from or on the under side of the one boiler-section and upper side of the next boiler-section, so that they fit or bear one upon the other. These nozzles are constructed to form sockets, being formed, respectively—that is, each meeting pair of nozzles—the one with a continuous tongue, $i$, and the other with a corresponding continuous groove, $k$, as more clearly shown in Fig. 5, for entry one within the other, a rubber strip being placed over the groove, so that when the tongue is forced into the groove by the fitting of the boiler-sections together said rubber will be carried along with it to form a close water-tight packing, $l$, thereby preventing leakage of water into the flue-spaces of the boiler, and, such nozzles or sockets being exposed on their interior to the water, the rubber or flexible packing $l$ is prevented from being injured or burned. This connection of the water-spaces of the boiler-sections is made by the sections themselves, the nozzles or sockets $h\ h$ being part of them, and such connections provide for the circulation of the water alternately in reverse horizontal directions through the sections from the feed or inlet pipe E up to the outlet-pipe F, or to the upper section of the boiler when the boiler is used to generate and circulate steam, and in which case, if desired, a steam-dome may be erected on the boiler. The upper section, B', of all is or may be made without water-ducts C C, and may have its bottom formed of a corrugated plate, G, to give an extended heating-surface to the water or steam within said section. One or more of the sides of the boiler are fitted with a series of lids or door, $m$, opposite the flue-spaces $g'$, between the top of one series of water-ducts C and the bottom of the next series of said ducts immediately above, to provide for scraping out or removing any soot or matter deposited on top of the ducts C C, and the several water-ducts may be furnished with screw-plugs $n$, fitting holes in the side of the boiler, to provide for cleaning out said ducts or water-spaces of the sections.

When it is desired to pass the gaseous products of combustion up through the boiler in a tortuous horizontal course or series of courses, instead of in a tortuous vertical course or courses, as hereinbefore described, a series of draft-diverting plates, H, (see Figs. 6 and 7,) are arranged to rest upon the tops of the contiguous water-ducts C C in each horizontal series of said ducts, so as to close the flue-spaces $g$ on top, with the exception of the last one of said spaces near the one side of the boiler, such uncovered space $g$ occurring alternately on opposite sides of the boiler for each successive upper series of said ducts, whereby the gaseous products of combustion will be circulated alternately in reverse horizontal directions up through the boiler at right angles to the circulating courses of the water, and be caused to act both on the bottoms and sides of the ducts C C; also, by forming a cavity, $o$, on the under side of each of said plates H to a certain extent on the tops of said ducts. These draft-diverting plates H may be fitted loosely to their places, and be constructed with an under centering and strengthening rib, $s$. They may be introduced into the boiler when fitting the sections together, or by removing the boiler-sections for the purpose; or they may be entered through the openings covered by the doors $m$ in the side of the boiler.

Having thus described my invention, what I claim as new, and desire to secure by Letters Patent, is—

In a boiler composed of independent sections arranged one above the other, the sections B, each provided with the lugs $f$, the sides $d$, and the series of parallel tapering communicating ducts C, of less depth than the sides, and provided with the tubular projections $h$ at their ends, on opposite sides thereof, for establishing communication between the series of ducts of the several sections, the said projections being fitted together by tongue-and-groove joints, and the several sections being secured together by bolts $e$, passing through the said lugs, substantially as herein shown and described.

WILLIAM H. BYRAM.

Witnesses:
C. SEDGWICK,
EDWARD M. CLARK.